United States Patent
Bak et al.

(10) Patent No.: US 9,086,860 B2
(45) Date of Patent: Jul. 21, 2015

(54) BI-DIRECTIONAL LINKING OF PRODUCT BUILD INFORMATION

(71) Applicant: International Business Machines Corporation, Armonk, NY (US)

(72) Inventors: Nathan V. Bak, Portland, OR (US); David K. Olsen, Portland, OR (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 128 days.

(21) Appl. No.: 13/772,627

(22) Filed: Feb. 21, 2013

(65) Prior Publication Data

US 2014/0237448 A1 Aug. 21, 2014

(51) Int. Cl.
*G06F 9/44* (2006.01)
*G06Q 10/10* (2012.01)

(52) U.S. Cl.
CPC .. *G06F 8/20* (2013.01); *G06F 8/10* (2013.01); *G06F 8/30* (2013.01); *G06F 8/71* (2013.01); *G06Q 10/10* (2013.01)

(58) Field of Classification Search
CPC .......... G06F 8/10–8/38; G06Q 10/10–10/1097
See application file for complete search history.

(56) References Cited

U.S. PATENT DOCUMENTS

| | | | |
|---|---|---|---|
| 6,658,642 B1* | 12/2003 | Megiddo et al. | 717/101 |
| 6,662,357 B1 | 12/2003 | Bowman-Amuah | |
| 7,761,851 B2 | 7/2010 | Bailey et al. | |
| 7,805,702 B2* | 9/2010 | Jacovi et al. | 717/103 |
| 7,844,949 B2 | 11/2010 | Clemm et al. | |
| 8,095,571 B2 | 1/2012 | Bloesch et al. | |
| 8,095,911 B2 | 1/2012 | Ronen et al. | |
| 8,141,038 B2 | 3/2012 | O'Connell et al. | |
| 8,688,738 B2* | 4/2014 | Colton et al. | 707/791 |
| 8,793,654 B2* | 7/2014 | Schatz | 717/122 |
| 2005/0097508 A1* | 5/2005 | Jacovi et al. | 717/103 |
| 2007/0083423 A1* | 4/2007 | Delbridge | 705/12 |
| 2007/0240102 A1 | 10/2007 | Bello et al. | |
| 2008/0244505 A1* | 10/2008 | Smilowitz et al. | 717/100 |
| 2010/0153920 A1 | 6/2010 | Bonnet | |
| 2010/0287104 A1* | 11/2010 | Leroy | 705/300 |
| 2010/0306730 A9 | 12/2010 | Carlson et al. | |
| 2012/0005575 A1* | 1/2012 | Colton et al. | 715/255 |
| 2012/0079448 A1* | 3/2012 | Cope et al. | 717/101 |
| 2012/0240096 A1* | 9/2012 | Sass | 717/101 |
| 2012/0246618 A1* | 9/2012 | Schatz | 717/122 |

OTHER PUBLICATIONS

Kogut, Bruce et al., Open Source Software Development and Distributed Innovation, 2001, pp. 1-40.*
Fitzgerald, Brian, The Transformation of Open Source Software, 2006, pp. 587-598.*

(Continued)

*Primary Examiner* — Thuy Dao
*Assistant Examiner* — Christopher Franco
(74) *Attorney, Agent, or Firm* — Cuenot, Forsythe & Kim, LLC

(57) ABSTRACT

Software product build information is bi-directionally linked. At least a first build instance of the software product is built and the first build instance is published by a supplier build repository. Responsive to an entity who is not the supplier indicating a use of the first build instance in a client product, build information relating to the use of the first build instance in the client product is received. The build information relating to the use of the first build instance in the client product is published by the supplier build repository.

9 Claims, 3 Drawing Sheets

(56) References Cited

OTHER PUBLICATIONS

Scacchi, W., Understanding the requirements for developing open source software systems, 2002, pp. 24-39.*

Loeliger, Joe, Version Control with Git: Powerful tools and techniques for collaborative software development, 2009, 7-299.*

Atwood, Christopher A., et al., Collaborative Software Development of Scalable DoD Computational Engineering, 2010, pp. 414-420.*

So, Poman, Object-Oriented CEM Programming, 2008, pp. 123-130.*

* cited by examiner

BI-DIRECTIONAL LINKING OF PRODUCT BUILD INFORMATION

BACKGROUND

Arrangements described herein relate to managing product builds.

Software developers often build applications using existing components in lieu of programming entire applications from scratch. Subroutine libraries, program generators, visual programming systems and databases are examples of software technologies that have been developed to facilitate application development.

There are a number of reasons why using existing software components is desirable. For example, the use of existing software components reduces the amount of time dedicated to writing program code. Moreover, developers can focus on high level integration of the software components into an application without necessarily having expertise to program the components themselves. Also, existing software components oftentimes have been extensively tested, thus reducing the amount of time necessary for testing and de-bugging of an application using the software components.

BRIEF SUMMARY

One or more embodiments disclosed within this specification relate to bi-directionally linking software product build information.

A method of bi-directionally linking software product build information can include building, via a supplier side processor, at least a first build instance of the software product and publishing the first build instance by a supplier build repository. The method also can include, responsive to an entity who is not the supplier indicating a use of the first build instance in a client product, receiving build information relating to the use of the first build instance in the client product. The method further can include publishing by the supplier build repository the build information relating to the use of the first build instance in the client product.

Another embodiment can include a system having a processor. The processor can be configured to initiate executable operations. The executable operations can include building, via a supplier side processor, at least a first build instance of the software product and publishing the first build instance by a supplier build repository. The executable operations also can include, responsive to an entity who is not the supplier indicating a use of the first build instance in a client product, receiving build information relating to the use of the first build instance in the client product. The executable operations further can include publishing by the supplier build repository the build information relating to the use of the first build instance in the client product.

Another embodiment can include a computer program product for bi-directionally linking software product build information. The computer program product can include a computer-readable storage medium having stored thereon program code that, when executed, configures a processor to perform a method. The method can include building, via a supplier side processor, at least a first build instance of the software product and publishing the first build instance by a supplier build repository. The method also can include, responsive to an entity who is not the supplier indicating a use of the first build instance in a client product, receiving build information relating to the use of the first build instance in the client product. The method further can include publishing by the supplier build repository the build information relating to the use of the first build instance in the client product.

DETAILED DESCRIPTION

Figure 1:
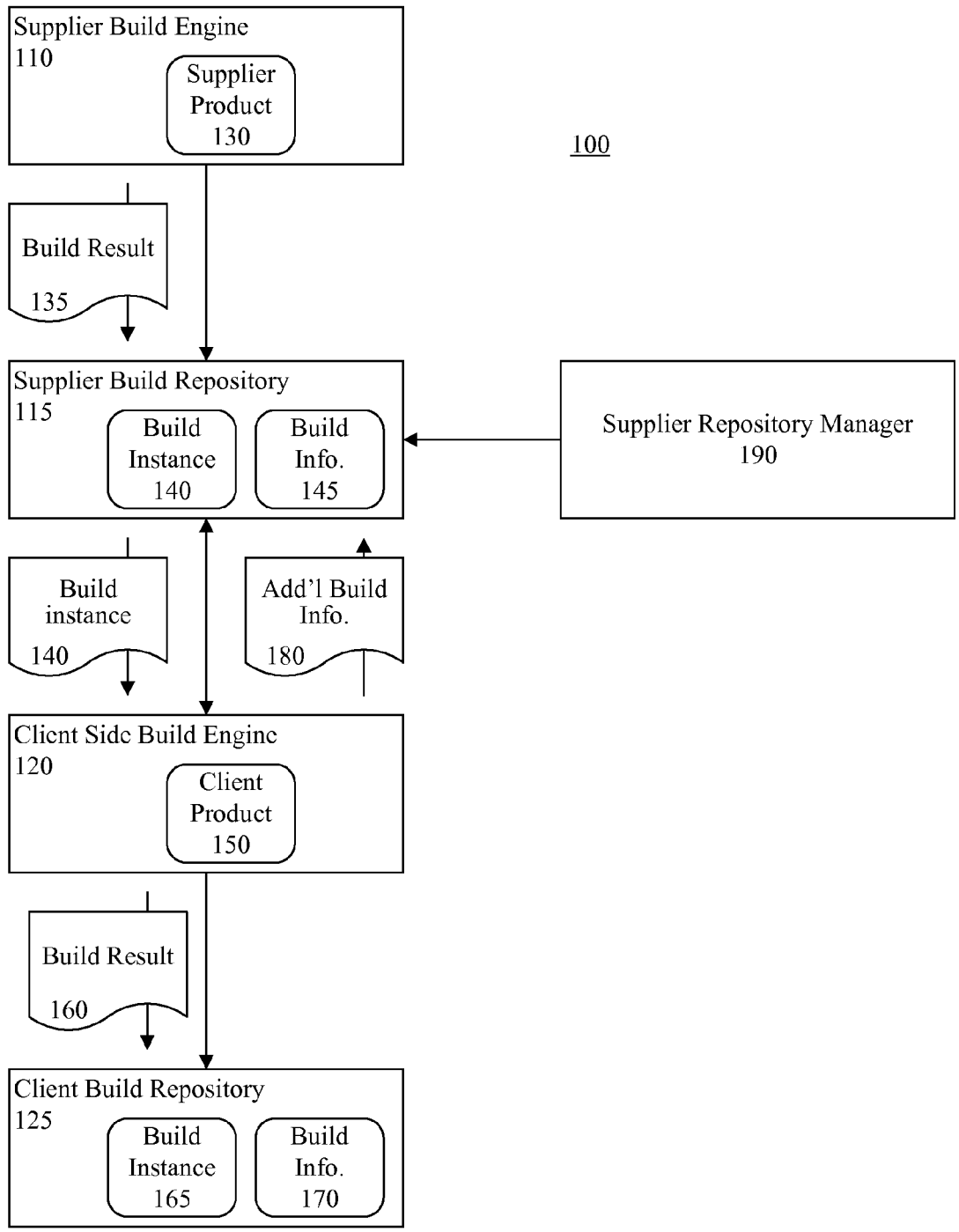
FIG. 1 is a block diagram illustrating a system for bi-directionally linking software product build information in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to bi-directionally linking software product build information between a supplier that provides product builds and entities that use the product builds. Several definitions that apply throughout this document will now be presented.

As used herein, the term "product build" means a process by which a product is built. For example, a "product build X" refers to a process of manipulating source code to produce a product "X." Certain product build information is typically constant across a product build such as the product name, product owner, website, etc. Other product build information is not constant, however. For example, different build information may be associated with different build streams or build instances.

As used herein, the term "build stream" means a specific version of a product. For example, a "Product build X" may contain multiple build streams such as "Build stream 1.0", "Build stream 1.5" and "Build stream latest." Product build information constant across a build stream may include the version number, release lead, and supplier builds and components.

As used herein, the term "build instance" means a specific instance in which product "X" is produced from source code. Build instances typically are identified by build identifiers. A build identifier can be a time stamp, but this is not a requirement. A build stream can contain multiple build instances. Each build instance has a unique (for at least the build stream) build identifier. Each build instance also can have an associated result identifier (e.g., success or failure, green or red, etc.).

As used herein, the term "build engine" means software that implements a product build to build a product. For instance, a build engine may implement a "product build X" to produce a build instance of product "X." The build engine also may implement the "product build X" to produce other build instances of product "X" when the source code for product "X" is updated/changed.

As used herein, the term "build result" means components built for a particular build instance and associated build information related to the build instance. The associated build information can be metadata, though this need not be the case.

As used herein, the term "build repository" means a storage area configured to store one or more build streams and/or build instances. A build repository also may be configured to store various product build information, such as information described herein. In illustration, a build repository can include a database that stores product build information for a product, build streams of the product and/or build instances of the product. The database also can identify where build components are stored in the build repository.

As used herein, the term "publish" means to store and make accessible to one or more entities for use. For example a repository may receive a build instance and/or build information, store the build instance and/or build information, and make the build instance and/or build information accessible to one or more entities that choose to access the build instance and/or build information.

FIG. 1 is a block diagram illustrating a system 100 for bi-directionally linking software product build information in accordance with one embodiment disclosed within this specification. The system can include a supplier build engine 110, a supplier build repository 115, a client side build engine 120 and a client build repository 125.

In operation, the supplier build engine 110 can, via a processor, execute a product build to create a build instance 140 for a supplier product 130. For example, the supplier build engine 110 can execute the product build to generate a build result 135 for the supplier product 130. The build result 135 can include the build instance 140 and corresponding build information 145. Execution of the product build can be initiated by the supplier who maintains the supplier product 130 for which the build instance 140 is created.

The supplier build engine 110 can communicate the build result 135 to the supplier build repository 115 to be published by the supplier build repository 115. The supplier build repository 115 can include files where the components of the build instance 140 are stored, and a database in which the build information 145 is stored. Additional build instances and build information for the product also can be published by the supplier build repository 115. The build instance 140 can include components of the supplier product 130 built for that build instance 140. The build information 145 can identify information about the supplier side build of the build instance 140, for example information related to the product for which the build instance 140 is built, information related to the build stream for which the build instance 140 is built, the components of the supplier product 130 used in the build instance 140, and any other information relevant to the supplier product 130, the build stream, the build instance 140 and/or the supplier who built, via the supplier build engine 110, the build instance 140.

An entity, for example a user, group or organization who is not a supplier of the product, or a user, group or organization who is the supplier of the product, can access the build instance 140 to build other products that include the build instance 140, or that include components of the supplier product 130 included in the build instance 140. For example, the entity can access the build instance 140 from the supplier build repository 115. As noted, the supplier build repository 115 also may contain other build instances. Rules can be configured and enforced so that the latest good build instance 140 of the product is available to be accessed, or the same build instance 140 presently in use elsewhere is available to be accessed. The invention is not limited in this regard, however, and rules can be configured and enforced to allow other build instances to be accessed.

In illustration, an entity can access the build instance 140 using a uniform resource identifier (URI) (e.g., a uniform resource locator (URL)) or access the build instance 140 in any other suitable manner. The entity may access the desired build instance 140 directly from the supplier build repository 115, or another repository where the build instance 140 may be stored. For example, a first entity may use a particular build instance 140 for their product, and publish the build result for that product by another repository. Such build result for the first entity's own product can include the build instance 140 and at least a portion of the build information 145 for the build instance 140. A second entity may access the build instance 140, and any corresponding build information 145, from the repository of the first entity or from the supplier build repository 115. By way of example, the build result for the first entity's own product can indicate where the build instance 140 may be accessed.

In some instances, the entity, for example a user representing the entity, may be required to enter entity and/or user data to access the build instance 140. For example, the user can provide a unique identifier, such as a user name, email address, or the like, a password or pass code, etc. The present arrangements are not limited in this regard, however.

Regardless of how an entity accesses the particular build instance 140, when the entity accesses the build instance 140, the corresponding build information 145 also may be provided to that entity. The client side build engine 120 can, via a processor, execute a product build for a client product 150 to generate a build result 160 for the client product 150. Execution of the client side product build can be initiated by an entity who maintains a client product 150 for which a build instance 165 is created. The build result 160 can include a build instance 165 of the client product 150 and build information for the build instance 165. The client product 150, and hence the build instance 165, can include one or more components of the build instance 140. For example, the number of components of the build instance 140 that are used in the build instance 165 of the client product 150 can be less than the total number of components of the build instance 140, though this need not be the case.

The client side build engine 120 can communicate the build result 160 to the client build repository 125 to be published by the client build repository 125. The client build repository 125 can include files where the components of the build instance 165 are stored, and a database in which the build information 170 is stored. Additional build instances and build information for the client side product also can be published by the client build repository 125.

The build information 170 can identify information about the client side build of the build instance 165, for example information related to the client product 150 for which the build instance 165 is built, information related to the build stream for which the build instance 165 is built, the components of the client product 150 used in the build instance 165 and any other information relevant to the client product 150, the build stream and/or the build instance 165. Moreover, the build information 170 can identify build information about the build instance 140 used in the build instance 165. For example, the build information 170 can identify the supplier of the build instance 140, the supplier product 130 for which the build instance 140 is generated, the stream for which the build instance 140 is generated, components of the build instance 140 that are used in the build instance 165, components of the supplier product 130 used in the build instance 140, and any other information relevant to the supplier product 130, the build stream for the supplier product 130 and/or the build instance 140. The build information 170 can be communicated to the client build repository 125 for publishing by the product build used by the client side build engine 120, or communicated to the client build repository 125 for publishing by another module which identifies the components of the build instance 140 used in the build instance 165.

Further, client side build engine 120 can communicate to the supplier build repository 115 additional build information 180 for the build instance 140. In another arrangement, the additional build information 180 for the build instance 140 can be provided by a user accessing the build instance 140, such as a user who is to retrieve the build instance 140 and provide the build instance 140 to the client side build engine 120. For example, the user can be prompted to enter such information, and such information can be validated before the user is provided access to the build instance 140. In other arrangements, a portion of the additional build information 180 can be provided by the user and a portion of the additional build information 180 can be provided by the client side build engine 120.

The supplier build repository 115 may add the additional build information 180 to the existing build information 145, thereby associating the additional build information 180 with the build instance 140 and existing build information 145, and causing the additional build information 180 to be published by nature of the build information 145 being published. Because the additional build information 180 is provided by the client side build engine 120, the additional build information 180 indicates the entity's use of the build instance 140.

Such additional build information 180 can identify the entity that uses the build instance 140 to generate the build instance 165, the particular build instance 140, the particular build instance 165, the components of the build instance 140 used in the build instance 165, components of the client product 150 used in the build instance 165, the build stream for which the build instance 165 is generated, the build stream for which the build instance 140 is generated, the supplier product 130 for which the build instance 140 is generated, the client product 150 for which the build instance 165 is generated and/or the like. The additional build information 180 can be communicated to the supplier build repository 115 for publishing by the product build used by the client side build engine 120, or can be communicated to the supplier build repository 115 for publishing by another module which identifies the components of the build instance 140 used in the build instance 165. Accordingly, the build information contained in, and published by, the supplier build repository 115 can identify client products (such as the client product 150) which use particular build instances (such as the build instance 140) of the supplier product 130, as well as indicate dependencies and/or relationships.

At this point it should be noted that since the supplier build repository 115 and/or the client build repository 125 include information which may be used to establish bi-directional linking of build information related to the build instance 140, no additional repository and/or database is required to implement the processes/methods described herein.

Any of a variety of means can be used perform the aforementioned publishing of the build results 135, 160. For example, using one or more suitable file transfer (FTP) protocols, representational state transfer (REST) (e.g., in accordance with Open Services for Lifecycle Collaboration Change Management (OSLC-CM)), or the like. Suitable application program interfaces (APIs) can be provided to facilitate publishing of the build results in accordance with a suitable program protocol, though this need not be the case. Further, the aforementioned databases can be updated with record updates or addition of new records, new information can be posted, or the like. When a series of build instances publish, it may only be necessary to update product build and/or product stream information in the event of a change of the information. In some instances, only information for the most recent build instance 165 of a client product 150 need be kept.

The system 100 further can include a supplier repository manager 190. The supplier repository manager 190 can be configured to monitor, based on the build information (e.g., the build information 145), information relating to the usage of build instances (e.g., the build instance 140) in client products (e.g., the client product 150). The supplier repository manager 190 also can be configured to delete or archive build instances, and corresponding build information, for those build instances not being used in the most recent versions of client products 150 or not being used at all. If no current client products 150 are using a particular build instance, the supplier repository manager 190 can be confident that deleting or archiving that build instance will not affect the client products. For example, if the build information 145 indicates that the client product 150 is using the build instance 140, a new build instance of the supplier product 130 is built, and the build information for the new build instance for the supplier product 130 indicates that a new build instance of the client product 150 is using the new build instance of the supplier product 130, then the supplier repository manager 190 can delete and/or archive the build instance 140 and the associated build information 145.

Moreover, the supplier repository manager 190 can be configured to proactively notify entities maintaining client products (e.g., an entity maintaining the client product 150) changes to particular components of the supplier product 130 that have been, or are planned to be, implemented subsequent to the use of such components in the client products. In illustration, if a new build instance of the supplier product 130 has been built, the supplier repository manager 190 can identify such new build instance and notify the entity managing the client product 150 that the new build instance is available. Similarly, if a new build instance of the supplier product 130 has been planned, information regarding the plan can be added to the supplier build repository 115. The supplier repository manager 190 can identify plan to build the new build instance and notify the entity managing the client product 150 that the new build instance is planned.

The supplier repository manager 190 can communicate messages to such entities to notify the entities of such changes, for example via email, text messaging, or the like. Further, if significant defects are discovered in a particular build instance, the supplier repository manager 190 identify entities which have used the particular build instance, and notify communicate messages to such entities to notify the entities of the defects and/or recommend that such entities use another build instance in their respective client products 150.

In addition, by knowing which entities are using the supplier product 130, the owner of the supplier product 130 (e.g., via the supplier repository manager 190) is able to, based on the additional build information 180 added to the build information 145, perform verification as to whether the client products 150, or the entities that manage the client products 150, are complying with license requirements pertaining to the use of the supplier product 130 (e.g., the build instance 140) in the client product 150. In illustration, the additional build information 180 can be processed by the supplier repository manager 190 to determine whether the additional build information 180 includes information pertinent to a particular licensing scheme. Such information can be automatically requested of an entity when the entity requests to access a build instance.

The various notification/publications described herein can be communicated in any suitable manner, for example via one or more communication networks. Such communication networks can be implemented as, or include, any of a variety of different networks such as a WAN, a LAN, a wireless network, a mobile network, a Virtual Private Network (VPN), the Internet, the Public Switched Telephone Network (PSTN), or the like.

Figure 2:
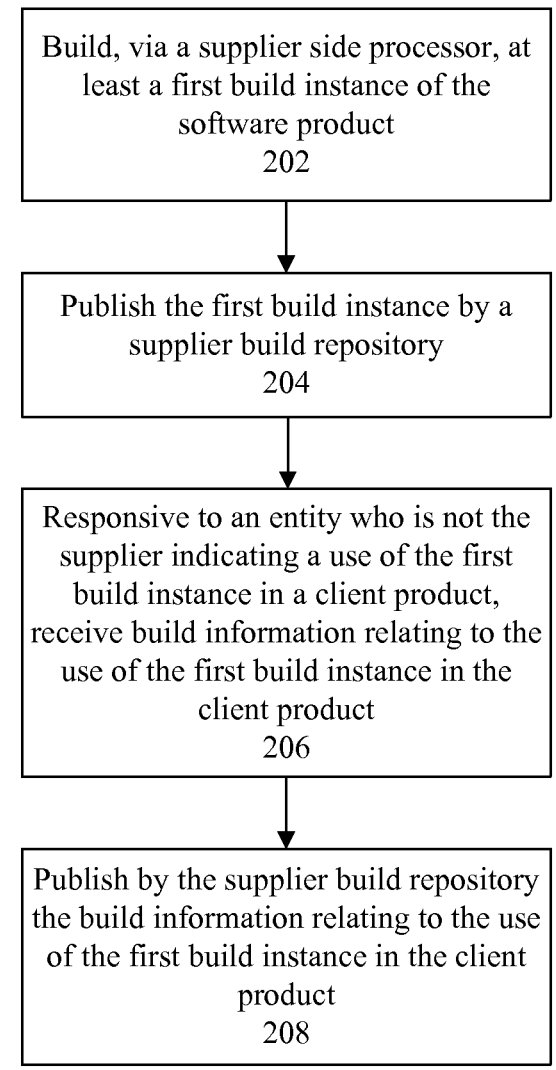
FIG. 2 is a flow chart illustrating a method of bi-directionally linking software product build information in accordance with one embodiment disclosed within this specification.

FIG. 2 is a flow chart illustrating a method of bi-directionally linking software product build information in accordance with one embodiment disclosed within this specification. At step 202, via a client side processor, at least a first build instance of the software product can be build. At step 204, the first build instance can be published by a supplier build repository. At step 206, responsive to an entity who is not the supplier indicating a use of the first build instance in a client product, build information relating to the use of the first build instance in the client product can be received. At step 208, the build information relating to the use of the first build instance in the client product can be published by the supplier build repository.

Figure 3:
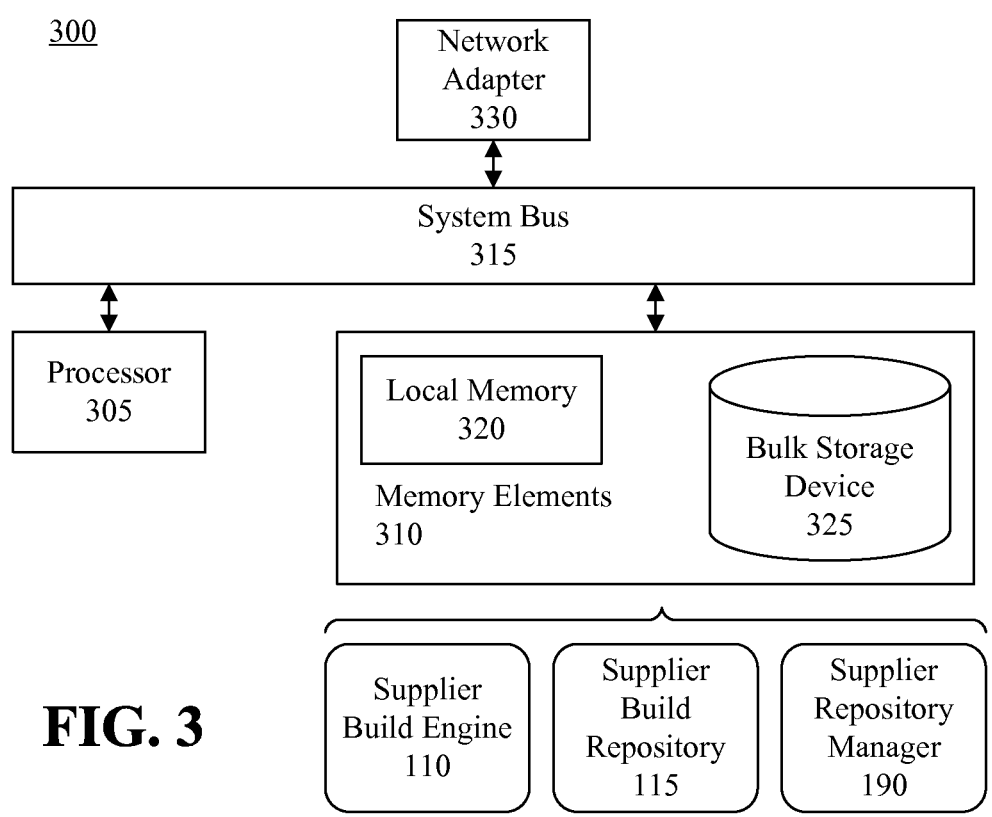
FIG. 3 is a processing system for bi-directionally linking software product build information in accordance with one embodiment disclosed within this specification.

FIG. 3 is a processing system 300 for bi-directionally linking software product build information in accordance with one embodiment disclosed within this specification. The processing system 300 can include at least one processor 305 (e.g., a central processing unit) coupled to memory elements 310 through a system bus 315 or other suitable circuitry. As such, the processing system 300 can store program code within the memory elements 310. The processor 305 can execute the program code accessed from the memory elements 310 via the system bus 315. It should be appreciated that the processing system 300 can be implemented in the form of any system including a processor and memory that is capable of performing the functions and/or operations described within this specification. For example, the processing system 300 can be implemented as a computer, or a plurality of computers which are communicatively linked, for example via one or more communication networks.

The memory elements 310 can include one or more physical memory devices such as, for example, local memory 320 and one or more bulk storage devices 325. Local memory 320 refers to RAM or other non-persistent memory device(s) generally used during actual execution of the program code. The bulk storage device(s) 325 can be implemented as a hard disk drive (HDD), solid state drive (SSD), or other persistent data storage device. The processing system 300 also can include one or more cache memories (not shown) that provide temporary storage of at least some program code in order to reduce the number of times program code must be retrieved from the bulk storage device 325 during execution.

Input/output (I/O) devices such as one or more network adapters 330 can be coupled to processing system 300 to enable processing system 300 to become coupled to other systems, computer systems, remote printers, and/or remote storage devices through intervening private or public networks. Modems, cable modems, transceivers, and Ethernet cards are examples of different types of network adapters 330 that can be used with processing system 300.

As pictured in FIG. 3, the memory elements 310 can store the components of the system 100 of FIG. 1, such as the supplier build engine 110, the supplier build repository 115 and the supplier repository manager 190. Being implemented in the form of executable program code, these components of the system 100 can be executed by the processing system 300 and, as such, can be considered part of the processing system 300. Moreover, the supplier build engine 110, the supplier build repository 115 and the supplier repository manager 190 are functional data structures that impart functionality when employed as part of the processing system of FIG. 3.

A processing system similar to that described for FIG. 3 can be used to host the client side build engine 120 and/or the client build repository 125 described in FIG. 1.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of bi-directionally linking software product build information, comprising:
   building, via a supplier side processor, at least a first build instance of the software product;
   publishing the first build instance by a supplier build repository;
   responsive to an entity who is not the supplier indicating a use of the first build instance in a client product, receiving build information relating to the use of the first build instance in the client product, wherein the build information relating to the use of the first build instance in the client product indicates components of the first build instance that are used in the client product, wherein the number of components of the first build instance that are used in the client product are less than the total number of components of the first build instance;

determining, based on the build information relating to the use of the first build instance in the client product, whether the entity is complying with at least one license requirement pertaining to the use of the first build instance in the client product;

publishing by the supplier build repository the build information relating to the use of the first build instance in the client product;

building at least a second build instance of the software product;

publishing the second build instance to the supplier build repository; and responsive to the entity indicating a use of the second build instance in the client product, archiving or deleting the first build instance of the software product.

2. The method of claim 1, further comprising:
notifying the entity that the second build instance is available.

3. The method of claim 1, further comprising:
identifying a plan to build at least the second build instance of the software product; and
notifying the entity of the plan to build the second build instance of the software product.

4. A system comprising:
a processor programmed to initiate executable operations comprising:
building, via a supplier side processor, at least a first build instance of the software product;
publishing the first build instance by a supplier build repository;
responsive to an entity who is not the supplier indicating a use of the first build instance in a client product, receiving build information relating to the use of the first build instance in the client product, wherein the build information relating to the use of the first build instance in the client product indicates components of the first build instance that are used in the client product, wherein the number of components of the first build instance that are used in the client product are less than the total number of components of the first build instance;
determining, based on the build information relating to the use of the first build instance in the client product, whether the entity is complying with at least one license requirement pertaining to the use of the first build instance in the client product;
publishing by the supplier build repository the build information relating to the use of the first build instance in the client product;
building at least a second build instance of the software product;
publishing the second build instance to the supplier build repository; and
responsive to the entity indicating a use of the second build instance in the client product, archiving or deleting the first build instance of the software product.

5. The system of claim 4, the executable operations further comprising:
notifying the entity that the second build instance is available.

6. The system of claim 4, the executable operations further comprising:
identifying a plan to build at least the second build instance of the software product; and
notifying the entity of the plan to build the second build instance of the software product.

7. A computer program product for bi-directionally linking software product build information, the computer program product comprising a computer readable storage memory, wherein the computer readable storage memory is not a transitory, propagating signal per se, having program code stored thereon, the program code executable by a processor to perform a method comprising:
building, by a supplier side processor, at least a first build instance of the software product;
publishing, by the processor, the first build instance by a supplier build repository;
responsive to an entity who is not the supplier indicating a use of the first build instance in a client product, by the processor, receiving build information relating to the use of the first build instance in the client product, wherein the build information relating to the use of the first build instance in the client product indicates components of the first build instance that are used in the client product, wherein the number of components of the first build instance that are used in the client product are less than the total number of components of the first build instance;
determining, based on the build information relating to the use of the first build instance in the client product, whether the entity is complying with at least one license requirement pertaining to the use of the first build instance in the client product;
by the processor, publishing by the supplier build repository the build information relating to the use of the first build instance in the client product;
building at least a second build instance of the software product;
publishing the second build instance to the supplier build repository; and
responsive to the entity indicating a use of the second build instance in the client product, archiving or deleting the first build instance of the software product.

8. The computer program product of claim 7, the method further comprising:
notifying the entity that the second build instance is available.

9. The computer program product of claim 7, the method further comprising:
identifying a plan to build at least the second build instance of the software product; and
notifying the entity of the plan to build the second build instance of the software product.

* * * * *